United States Patent [19]

Schwar

[11] Patent Number: 4,748,747
[45] Date of Patent: Jun. 7, 1988

[54] DIMENSION-MEASURING PROBE WITH A PIVOTED PROBING ARM

[75] Inventor: Ernst Schwar, VS-Muhlhausen, Fed. Rep. of Germany

[73] Assignee: Hommelwerke GmbH, Fed. Rep. of Germany

[21] Appl. No.: 2,751

[22] Filed: Jan. 12, 1987

[30] Foreign Application Priority Data

Sep. 26, 1986 [DE] Fed. Rep. of Germany ....... 3632751

[51] Int. Cl.[4] ............................................. G01B 5/00
[52] U.S. Cl. .............................. 33/148 R; 33/148 H; 33/147 F
[58] Field of Search ............. 33/143 R, 143 L, 148 R, 33/148 H, 149 R, 147 F, 147 L, 147 E, 172 R, 172 B, 169 R, 551, 555, 542, 543

[56] References Cited

U.S. PATENT DOCUMENTS 1,409,907  3/1922  Abbott ................................ 33/147 L
3,000,101  9/1961  Giardino et al. .................. 33/143 L

FOREIGN PATENT DOCUMENTS 890199  11/1943  France .............................. 33/172 B Primary Examiner—Harry N. Haroian
Attorney, Agent, or Firm—Allegretti, Newitt, Witcoff & McAndrews, Ltd.

[57] ABSTRACT

A dimension-measuring probe for fine measurements having a probe lever pivoted between its ends to provide an indicator arm and a sensing arm on opposite sides of the pivot. The sensing arm terminates in a pivot point. Spring means separate from the probe lever is provided next to the probe lever and connects to the probe point. The spring means serves to urge the probe point into contact with a work piece being measured. This structure eliminates stress on the sensing arm which tends to bend the arm and cause errors in measurement.

8 Claims, 1 Drawing Sheet

DIMENSION-MEASURING PROBE WITH A PIVOTED PROBING ARM

BACKGROUND OF THE INVENTION

The invention concerns a dimension-measuring probe having a probe arm pivoted between its ends, one end functioning to sense the dimension of a work piece and the other end reflecting on an indicator the magnitude of the measurement being taken at the sensing end.

A dimension-measuring probe of this type is disclosed in German Patent specification No. 25 54 421, the probing arm of which is prestressed in the direction of probing between its pivoted support and the probing points by means of a spring. The probing arm is bent by means of this prestressing, through which visible deviation and thus errors in measurement result. From this, there arise difficulties in the finest dimension-measuring technology, since the flexure changes during the alteration or reversal of direction of the support forces lead to impermissibly large and erroneous errors in measurement.

SUMMARY OF THE INVENTION

The object of the invention is to provide a dimension-measuring probe of the type stated in which measuring errors are avoided during the alteration or reversal of direction of the support forces, and which is thus suited for the infest dimension-measuring technology.

The basic concept of the invention consists of allowing the probing arm to be unstressed by the support force so that it does not flex to cause errors in measurement. This is achieved with a biasing means independent of the probe arm which engages the probe arm only in the area of the sensing end carrying the probing points, so that the probe arm is practically unstressed, and transmits the dimension value free of error.

The biasing means comprises a lever of suitable form which lies adjacent to and is coextensive with the probe arm. In one form of the invention the biasing lever is formed as a flat spring, which presses with one elastic end against the probe arm at its sensing end. In another form, the biasing means consists of a lever pivotally supported between its ends, the free end of which is connected in an operationally effective manner with the sensing end of the probe arm by means of a bar, a pin, a flat spring or the like. The biasing means is prestressed in the probing direction by means of a device which produces a spring force. In this form of the invention, the probe arm and biasing lever lie above or next to one another, so that the space requirement is minimized. It is preferred that the pivot support of the lever and that of the probe arm are spaced the same distance from the probing points on the sensing end of the probe arm. This means in practice that no relative movements arise during the transfer of the support force from the lever to the probe arm. Both can thus be firmly connected at the transfer point, as by means, for example, of a pin connection. A transfer of force to the sensing end of the probe arm can also take place by means of a cradle or flat spring connection. It is preferred that the probe arm and the flat springs or the prestressed lever be connected by a lateral bar in the area of the probing points, which serves to effect the transfer of the support forces.

THE DRAWINGS

The invention is illustrated in greater detail by means of the drawings in which FIG. 1 is a perspective view which depicts schematically an example of execution of a dimension-measuring probe in accordance with the invention;

DETAILED DESCRIPTION

Figure 1:
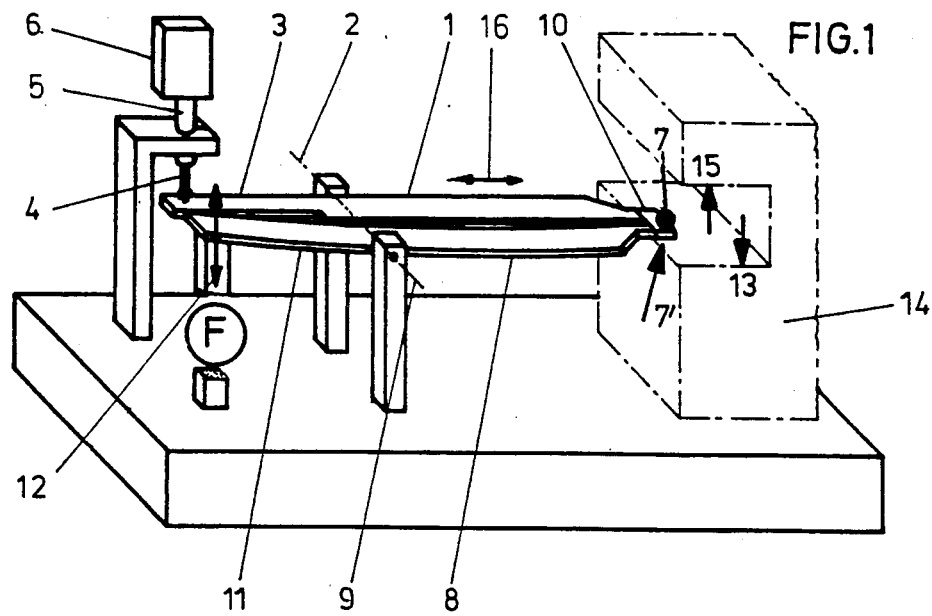

In FIG. 1, a probe arm 1 is pivotally mounted between its ends by means of a swivel support 2. The sensing end of the probe arm (at right in FIG. 1) senses the dimensions to be measured on a work piece 14. The movements at the sensing end are transferred to an indicator device 6 by means of the indicator end 3 through rod 4, which is slidably mounted in a guide unit 5 and can be read on a scale on indicator 6. In this manner, the deviations of a probing point 7 positioned on the sensing end of the probing arm 1 is indicated. On the lower side, not shown on the drawing, a probing point 7' is provided, directed opposite the probing point 7 so that dimensions can be probed in two different directions.

A biasing lever 8 is positioned immediately adjacent the probing arm 1 and is pivotally mounted between its ends by means of a swivel support 9 coaxial with the swivel support 2. The end of the lever 8 next to the probing points 7, 7' is connected by means of a bar 10 with the sensing end of the probe arm 1. To the left of the swivel support 9, the lever 8 extends as arm 11, on the end of which (schematically indicated) spring devices F engage in the direction of the double arrow 12 so that the probing points 7 and 7' are each biased in the direction of probing. Under biasing in the direction of the arrow pointing upwardly, a lower edge 13 of the aperture in work piece 14 can be probed with the probing point 7' while biasing the spring devices 12 in the direction of the arrow pointing downwards, an upper surface 15 of the work piece 14 can be probed.

As can be seen from the drawing, the probe arm 1 and biasing lever arm 8, together with the bar 10 operate as a unit. The parts are of simple construction and have a very low height dimension in the direction of measurement, so that sensing end of the probe arm 1, with the biasing lever 8 can be introduced without difficulty into very narrow apertures in the direction of the double arrow 16. The lateral wall of the work piece can be probed, for example, as regards its surface profile. Despite this simple construction, no errors in measurement arise because of the bending of the probing arm 1 since the arm transfers the dimensions probed completely free of stresses. The biasing force is transferred independently through the parallel lever 8 to the probing points 7 and 7'. Any flexure in the lever 8 does not impair measurement.

Figure 2:
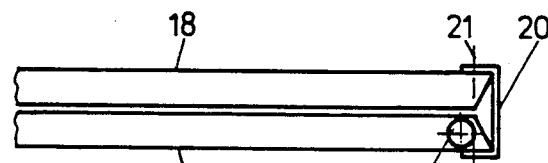
FIG. 2 is a plan view of the sensing part of a probe arm and a lever with a flat spring connection.

FIG. 2 is a plan view of the sensing end of a probe arm 17, next to which, precisely as in FIG. 1, a lever 18 is closely positioned. Both are coaxially supported as in FIG. 1. On the sensing end of the probing arm 17, there is positioned a probing point 19. A flat U-shaped spring 20 is firmly connected through its side members by means of pins 21 and 22, with the sensing end of the probing arm 17 and the adjacent end of lever 18. The desired biasing force is transferred from the lever 18 to the probing point 19.

Figure 3:
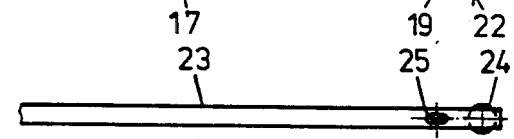
FIG. 3 is a side view of another means for connecting the lever and the probe arm at the sensing end.

FIG. 3 depicts, in a lateral view, the sensing end of a probing arm 23, carrying a probing point 24 formed as a ball. Closely adjacent to the probing point 24 is a small oblong hole 25 into which, as is evident from FIG. 4, a pin 26 engages in a sliding manner. The pin is located on the external end of a lever 27. The oblong hole 25 ensures that longitudinal forces can be avoided if the pivotal axes of the probing arm 23 and lever 27 are not precisely axially aligned. The guide between the pin 26 and the oblong hole 25 does not need to be free from play, since a clearance, as well as any flexure of the lever 27 does not influence the precision of measurement.

Figure 4:
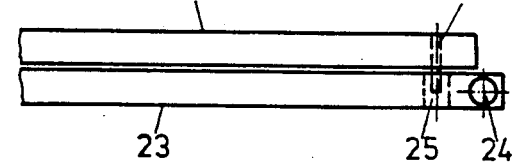
FIG. 4 is a view similar to FIG. 2 in which a pin connects the probe arm and the lever.
Figure 5:
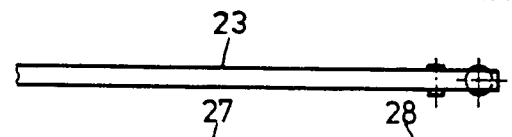
FIG. 5 is a side view of another connection in which a cradle on the lever embraces the probe arm.
Figure 6:
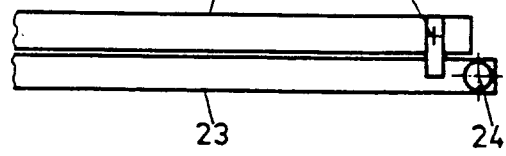
FIG. 6 is a plan view of the connection shown in FIG. 5.

FIGS. 5 and 6 depict an example of execution similar to that of FIGS. 3 and 4, and corresponding parts are provided wtih the same reference numerals. Instead of the pin/oblong hole connection, a cradle unit 28 is positioned on the external end of the lever 27 which encompasses the sensing end of the probe arm 23 close to the probing point 24, and thus transfers support forces, applied by the lever 27 to the probing point 24.

I claim:

1. A dimension-measuring probe for work pieces comprising a probe arm pivoted between its ends having a sensing end and an indicator end, and biasing means separate from said probe arm engaged with said probe arm at its sensing end to urge said end into contact with the work piece said biasing means comprising a lever lying adjacent said probe arm and pivoted between its ends at a point in alignment with said probe arm pivot.

2. The dimension-measuring probe of claim 1 which includes spring means engaged with the end of said lever opposite said sensing end to provide the biasing force, and an indicator having a scale, adjacent said indicator end, for indicating the magnitude of the dimension being sensed by said probe arm.

3. The dimension-measuring probe of claim 2 in which said sensing end has upper and lower probing points, and the end of said lever adjacent said sensing end is connected to said sensing end by means of a flat spring on said lever which presses against said sensing end.

4. The dimension-measuring probe of claim 2 in which the end of the lever adjacent said sensing end is connected to said sensing end by means of a laterally-extending bar.

5. The dimension-measuring probe of claim 2 in which the end of the lever adjacent said sensing end engages said sensing end by means of a laterally-extending pin which extends through bores in said probe arm and said lever, which bores are parallel to the axis of said pivots between the ends of said probe arm and said lever.

6. The dimension-measuring probe of claim 2 in which the end of the lever adjacent said sensing end is engaged with said sensing end by means of a cradle secured to said lever end and which embraces said sensing end.

7. The dimension-measuring probe of claim 3 in which said flat spring lies vertically disposed in a plane parallel to the axis of said pivots between the ends of said probe arm and said lever, said embraces the end of said lever and said sensing end.

8. The dimension-measuring probe of claim 1 in which said lever is a flat spring.

* * * * *